DEVICE FOR COMPUTATION OF ROOTS OF POLYNOMIALS

Filed June 8, 1950 4 Sheets-Sheet 1

INVENTOR
LOUIS C. FRAGER,

BY Wenderoth, Lind and Ponack
ATTORNEYS

June 30, 1953 L. C. FRAGER 2,643,821

DEVICE FOR COMPUTATION OF ROOTS OF POLYNOMIALS

Filed June 8, 1950 4 Sheets-Sheet 2

INVENTOR

LOUIS C. FRAGER,

BY

ATTORNEYS

FIG. 6
FIG. 5
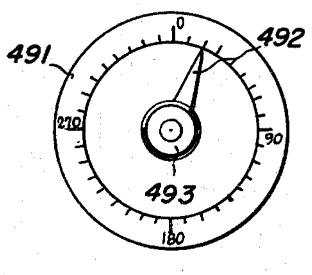
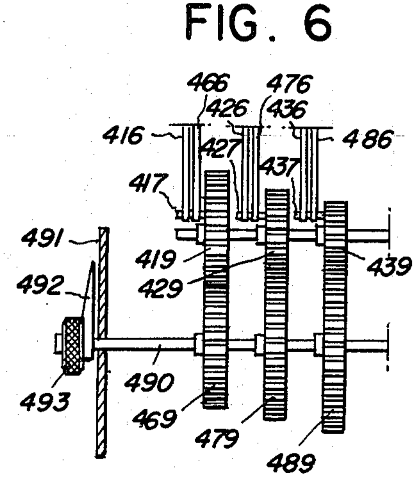
FIG. 7
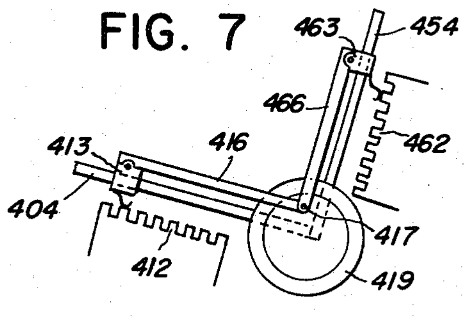
FIG. 11
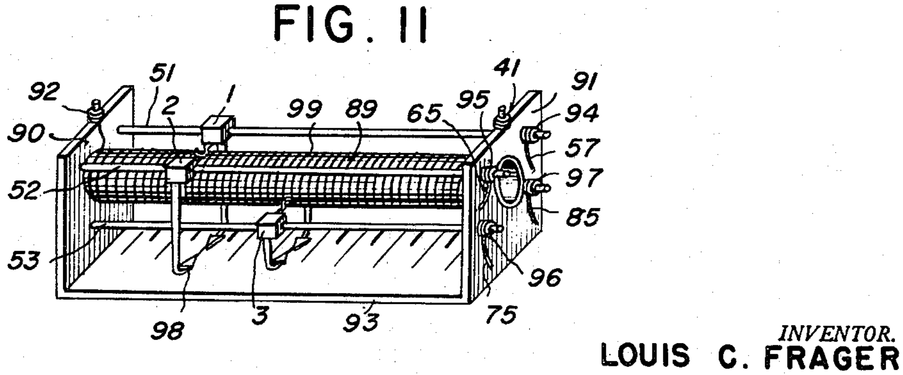
INVENTOR.
LOUIS C. FRAGER
BY Wenderoth, Lind & Ponack
ATTORNEYS INVENTOR.
LOUIS C. FRAGER,
BY Wenderoth, Lind and Ponack
ATTORNEYS Patented June 30, 1953

2,643,821

UNITED STATES PATENT OFFICE 2,643,821

DEVICE FOR COMPUTATION OF ROOTS OF POLYNOMIALS

Louis C. Frager, Paris, France, assignor to Office National d'Etudes et de Recherches Aeronautiques, Paris, France, a corporate body of France Application June 8, 1950, Serial No. 166,918
In France June 11, 1949

3 Claims. (Cl. 235—61)

The present invention relates to an automatic computer disclosing the rough values of the roots of polynomials, and more particularly disclosing whether some of these roots have complex values, or not, what is the sign of these roots, when real or what is the sign of the real portion of the same, or whether these roots have confused values denoting a critical regime, or not.

It is known that when an equation of $n$th degree of $p$ is to be solved, i. e. an equation of the type:

$$\sum_{q=0}^{n} a_q p^q = 0 \qquad (1)$$

wherein the generic term $a_q$ denotes a real constant value, and wherein $p^q$ is an unknown value $p$ raised to the power $q$, the solutions of such an equation are $n$ roots, which may have the ones or the others complex values or not. If a change of variable value is operated by assuming:

$$p = \rho e^{j\theta} \qquad (2)$$

$p$ will be considered as a complex variable value of an argument or phase $\theta$ and of a modulus or absolute value $\rho (j=\sqrt{-1})$. In the present specification the words argument and phase are taken as synonymous and describe the angle which fixes the direction of a complex number. It results therefrom that Equation 1 becomes:

$$\sum_{q=0}^{n} a_q \rho^q e^{jq\theta} = 0 \qquad (3)$$

If we consider an analytical function:

$$f(p) = \sum_{q=0}^{n} a_q \rho^q e^{jq\theta}$$

its roots will be given by the values of $\rho$ and of $\theta$ which render $f(p)$ equal to zero. The function $f(p)$ appears as a resultant of $n$ vectors characterized by respective moduli $a_q \rho^q$, and by respective arguments $q\theta$, i. e. the arguments of which form an arithmetical series.

If $\theta$ is given the value of $\pi/2$ (or $(2k+1/2)\pi$), the end of the vector $f(p)$ will draw a particular locus in the complex plane of $f$. This will be the locus which is the image, in the plane of $f$, of a straight line $\theta=\pi/2$ (or $\theta=(2k+1/2)\pi$) situated in the plane of $p$.

This locus will be a boundary separating the region where the real portion of $p$ is positive, from the region where this real portion is negative.

If successive curves $f(p)$ are drawn in the plane of $f$, for successive constant values of $\theta$, as many curves having constant values of $\theta$ will be obtained, as one has chosen fixed values of $\theta$; it is obvious that, by trying successive values, such values of $\theta$ will be found for which the vector $f(p)$ may be done equal to zero. It will suffice to draw as many loci having constant values of $\theta$ as will be necessary to find those which pass through the zero point. If for one of these solutions the value which is found for $\theta$ is comprised between $(2k-1/2)\pi$ and $(2k+1/2)\pi$, it will be concluded that there exists a root of $f(p)$ having a positive real portion.

If, one the contrary, the value found for $\theta$ is comprised between $(2k+1/2)\pi$ and $(2k+3/2)\pi$, it will be concluded that there exists a root having a negative real portion.

In case if $\theta=0$, there are one or several positive real roots.

In case if $\theta=\pi$, there are one or several negative real roots.

An object of the present invention is to provide cathode ray tube means for representing upon the screen of said tube taken as a complex variable plane, a straight line whose inclination with relation to a reference line shows the phase of the complex variable and upon the same screen taken as a complex function plane, means to represent the curve representing the function of a variable having the said predetermined phase.

Another object of the present invention is to provide means for varying continually the phase of the complex variable, that is, the inclination of the straight line representing upon the screen of the cathode ray tube such variable until the curve representing the function upon the same screen passes through the point on the screen representing the origin of the complex function plane.

Another object of the present invention is to establish a correspondence between a plurality of successive points upon the straight line representing the complex variable of a given phase and a plurality of successive points upon the curve representing the complex function.

Another object of the present invention is to provide means for determining the value of the modulus of a point of the straight line representing the complex variable which corresponds to a point of the curve representing the complex function which coincides with the origin of the complex function plane.

According to a first feature of the invention, the method of computation of roots of polynominals consists in the following operations:

To assume for the variable value of $p$, a damped alternative voltage, the amplitude of which $e^{-\alpha t}$, ($\alpha$ being the attenuation factor or growth constant) represents the modulus of the complex variable value, and the phase of which, that is the product $\omega t$ of the angular velocity by the time, represents the argument or phase of said variable value:

To assume for the real portion of the function $f(p)$ the sum of $n$ damped alternative voltages in $n$ circuits each representing one power of the variable value, and the resonant frequencies of which are integer multiple values of the frequency of the A. C. voltage representing the variable value, and the logarithmic decrements of which are equal to each other, which circuits being charged at first respectively up to voltages proportional to the polynomial coefficients, and which are discharged all at a time;

To assume as an imaginary portion of the function $f(p)$ the sum of the above damped A. C. voltages, but the phases of which are each delayed by $\pi/2$;

To compose perpendicularly the real portion plus a voltage proportional to the polynomial constant term and the imaginary portion of $f(p)$, in applying the representative voltages respectively to the pairs of deflection plates of a cathode ray tube;

To stroboscope the spot of this C. R. T., by increasing its brilliancy, at $2\pi/\omega$ intervals of time corresponding to arguments of $p$ differing from each other by the value of $2\pi$, so as to obtain, in the plane of $f$, a conformous transformed figure, represented by a succession of luminous points, of a vectorial radius located in the plane of $p$, and having a constant argument $\theta$;

To change the phase of the stroboscopic operation, so as to alter the argument $\theta$ of the variable value corresponding to visible points on the screen and so as to determine the value of this argument for which the pattern drawn by the luminous points passes through the zero point on the screen. This argument will be then the argument of the root so disclosed, and the logarithmus of its modulus is proportional to the number of luminous points comprised between the beginning of the discharge and the passage through the zero point.

According to a second feature, corresponding to an alternative embodiment of the invention, the method of computation of the roots of a polynomial consists in the following operations:

To assume as a variable value $p$ an aperiodic capacity discharge voltage the amplitude $e^{-\alpha t}$ of which (wherein $\alpha$ is the reciprocal value of the time constant of the discharge circuit) represents the modulus of the complex variable value;

To assume for the real portion of the function $f(p)$ the sum of $n$ aperiodic voltages in $n$ circuits representing each one a power of the variable value, and the time constants of which are integer dividers of the time constant of the circuit representing the variable value, and at first charged up to voltages respectively proportional to the polynomial coefficients, and which are discharged all at a time, each aperiodic voltage figuring in the sum being multiplied by cos $n\theta$ for the circuit of $n$th order;

To assume for the imaginary portion of the function $f(p)$ the sum of $n$ aperiodic voltages in $n$ circuits, pairwise identic to the former ones, each aperiodic voltage figuring in the sum being multiplied by sin $n\theta$ for the $n$th order circuit;

To compose perpendicularly the real portion plus a voltage proportional to the polynomial constant term, and the imaginary portion of $f(p)$, by applying the representative voltages respectively to the pairs of the deflection plates of a cathode ray tube;

To change the values of $\theta$ in the terms cos $n\theta$ and sin $n\theta$, by suitably adjusting brushes of potentiometers, and to determine the values of the argument $\theta$ for which the curve drawn on the cathode ray tube screen passes through the zero point of this screen. The argument $\theta$ is then the argument of the root so disclosed, and the logarithmus of its modulus is proportional to the time which is elapsed from the beginning of the discharge until the passage through the zero point.

The invention will be described hereunder in detail, with reference to three embodiments chosen in a nonrestrictive manner, the two first of which corresponding to the first feature of the invention, the third one corresponding to the second feature of the invention. These examples apply to polynomials of the third degree, but they are obviously applicable also to polynomials of any degree.

This description will be made with reference to the accompanying drawings in which.

Figure 4:
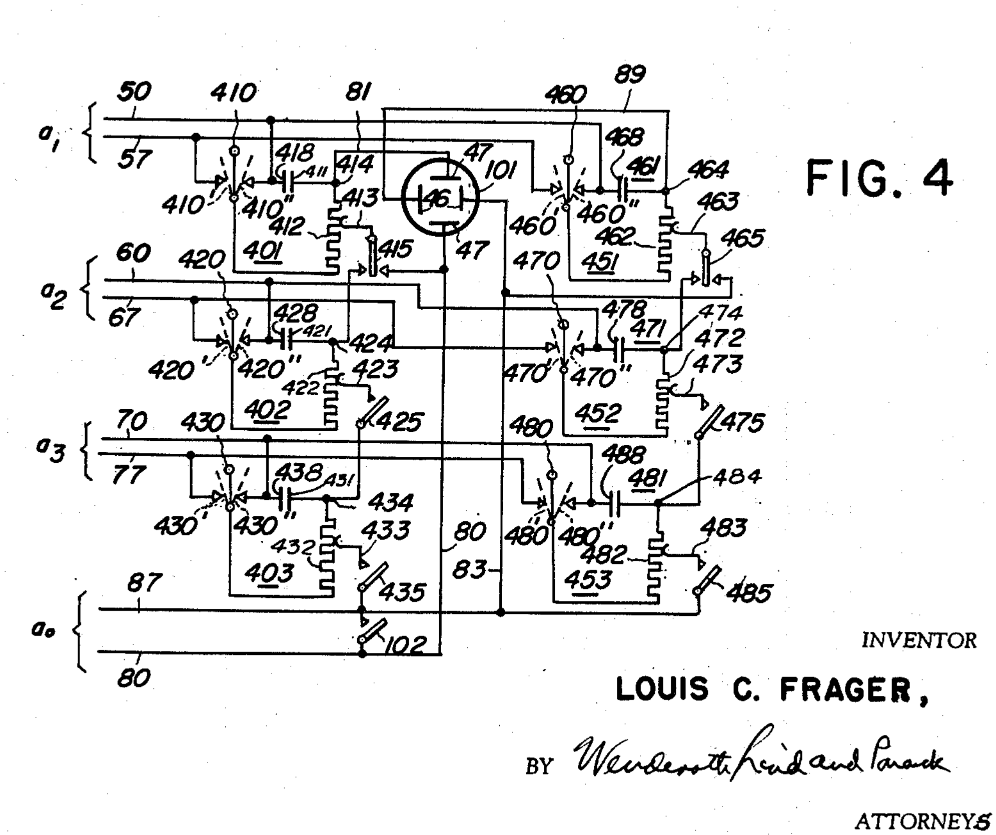

Figure 4 shows the diagram of a set of two electric circuits designed for an aperiodic exponential discharge and which are used for generation of voltages which are to be partially composed, a potentiometer enabling to adjust the initial voltages in condensers of said discharge circuits, as well as potentiometers of the respective circuits enabling to determine the fractions of voltages to be composed together.

Figures 5, 6 and 7 illustrate diagrammatically the mechanical devices for adjustment of the potentiometer brushes in each circuit so as to collect the fractions sin $\theta$, cos $\theta$, . . . sin $n\theta$, cos $n\theta$ of the voltages generated in each circuit.

Figures 8, 9, 10:
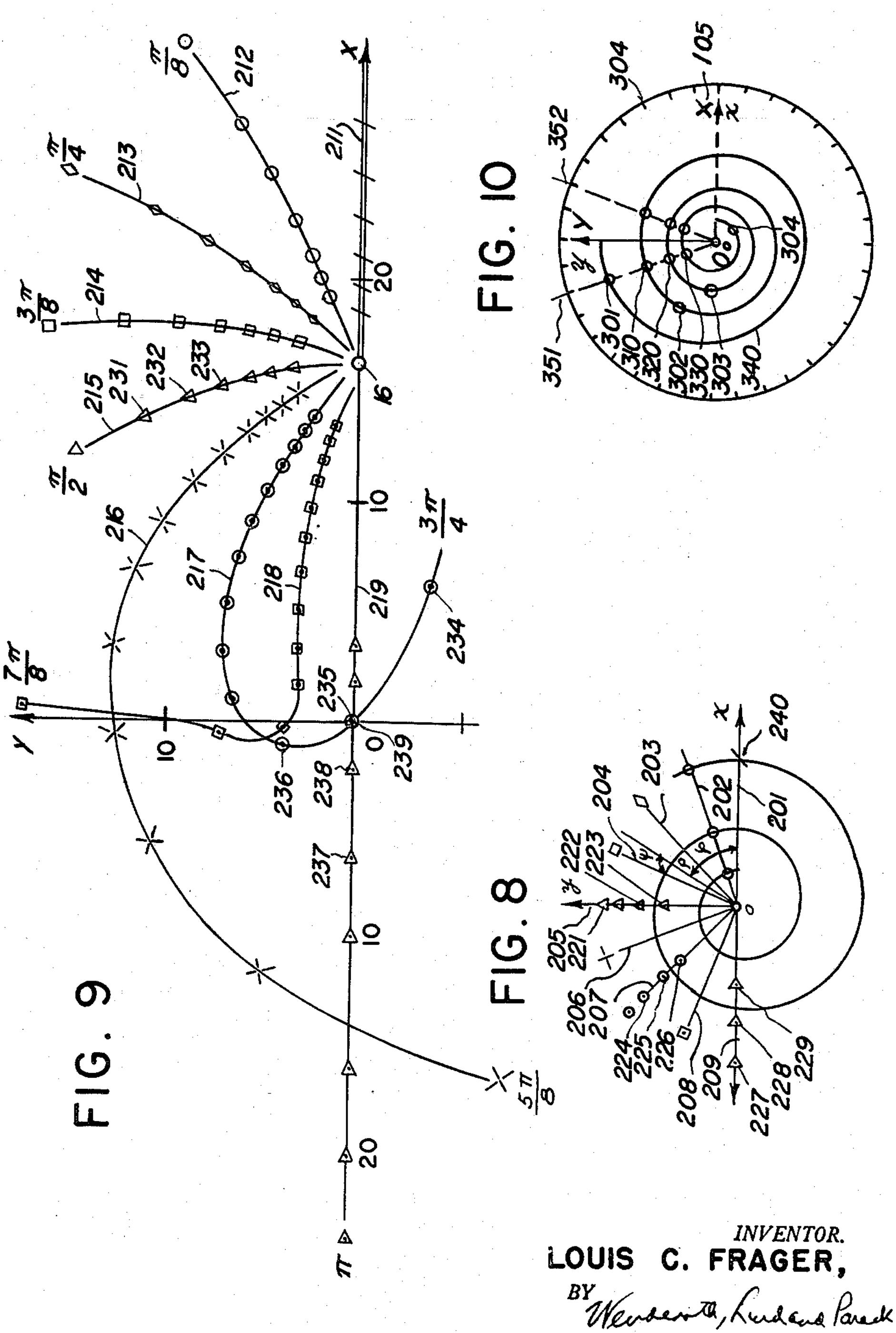

Figures 8, 9 and 10 represent illustrative diagrams of the curves appearing upon the screen of a cathode ray tube when the latter represents the plane of the complex variable, then the plane of the complex function.

Fig. 11 represents the potentiometer allowing obtaining continuous voltages proportional to the coefficients of the polynomial.

Referring now to Figs. 8 and 9, $ox$ represents the real axis in the complex variable plane and $oy$ the imaginary axis in said plane. In like manner OX represents the real axis in the complex function plane and OY the imaginary axis in said plane.

Let us assume that the polynomial to be resolved is $$a_3p^3+a_2p^2+a_1p+a_0\equiv p^3+6p^2+16p+16=0 \quad (4)$$

whose roots are 2, $-2+2j$ and $-2-2j$.

201, 202, 203, 204, 205, 206, 207, 208 and 209 are vectors having arguments increasing from zero to $\pi$ by stages of $\pi/8$ traced in the plane of the complex variable (Fig. 8).

211, 212, 213, 214, 215, 216, 217, 218, 219 are curves traced in the plane of the complex function (Fig. 9) and which are respectively the transformed curves corresponding to the vectors having a reference number of 10 units smaller than their own reference number. These curves are converging to the point of the abscissa $a_0=16$ which corresponds to the origin $o$ of the plane of the complex variable.

In a more precise way the equation of line 205 is for example $$p=\rho e^{j\frac{\pi}{2}}$$

and that of the corresponding curve 215 is:

$$f(\rho)=\rho^3 e^{3j\frac{\pi}{2}}+6\rho^2 e^{2j\frac{\pi}{2}}+16\rho e^{j\frac{\pi}{2}}+16$$

$$f(\rho)=(-6\rho^2+16)+j(\rho^3-16\rho)$$

Let us consider upon the line 205 a point 221 and a series of other points 222, 223 . . . such that, the distance between 221 and the origin $o$ having a certain value $a_1$, the distance between 222 and the origin should be equal to $a_1e^{-}$ , the distance between 223 and the origin to $a_1e^{-2\ \delta}$ . . . It results therefrom that the points 221, 222, 223 are at the intersection of the line 205 and an equiangular or logarithmic spiral 240 which makes with its radius vector an angle $\psi$ such that $$\tan \psi=-\frac{2\pi}{\delta}$$

(See Electromagnetic Waves by S. A. Schelkunoff, page 22, D. Van Nostrand).

There has been marked upon the curve 215 the points 231 corresponding to the point 221, 232 corresponding to the point 222, 233 corresponding to the point 223, etc. These points are represented upon Figs. 8 and 9 by small triangles.

There has also been marked and shown by small circles containing a center the points 224, 225 and 226 upon the line 207 whose mutual distances obey the same law as the points of the line 205 and their correspondants 234, 235, 236 upon the curve 217. The coordinates of the point 225 upon Fig. 8 are −2 and $2j$.

There has also been marked and shown by small triangles containing a center the points 227, 228 and 229 upon the line 209 whose mutual distances obey the same law as the points of the line 205 and their correspondents 237, 238, and 239 upon the curve 219. The coordinates of the point 229 upon Fig. 8 are −2 and 0.

Finally there has been shown conventionally at the end of the line 201 an oblique line and upon the curve 211 (which is no other than the axis of the abscissae of the complex function plane) a series of points represented by small oblique marks, at the end of the line 202 a small circle and upon the curve 212 a series of points represented by small circles, at the end of the line 203 a small diamond and upon the curve 213 a series of points represented by small diamonds, at the end of the line 204 a small square and upon the curve 214 a series of points represented by small squares, at the end of the line 206 a small cross and upon the curve 216 a series of points represented by small crosses, finally at the end of line 208 a small square containing a point and upon the curve 218 a series of points represented by small squares each containing a point.

The curve 215 defines in the plane of Fig. 9 a right hand region where the values of the real portion of the variable $p$ are positive and a left hand region where all the values of the real portion of the variable $p$ are negative. As the origin O of the plane of the complex function is in the left hand region one can deduce therefrom that the polynomial (4) has roots the real portion of which is negative.

The curve 217 passes through the origin O and has a point 235 which coincides with such origin. One deduces therefrom that the point 225 is a point representative of a root of the polynomial.

The curve 219 passes through the origin O and has a point 239 which coincides with such origin. One deduces therefrom that the point 229 is a point representative of a root of the polynomial.

In the solving of equations which is now to be described, there will be made to appear upon the screen of a cathode ray tube taken successively as a complex variable plane and as a complex function plane on one hand a family of lines such as the lines 201 to 209 and upon the other hand corresponding transformed curves 211 to 219. The center of the screen of the cathode ray tube being at the same time the origin $o$ of the coordinates of the plane of the variable and the origin O of the coordinates of the plane of the function will be designated by the reference character Oo. Finally, according to the case, the lines of Fig. 8 and the curves of Fig. 9 will be materialized upon the screen of the cathode ray tube either by a luminous discontinuous line of points or by a continuous luminous line.

Finally, it will be noted that the curves of Fig. 9 converge to the abscissa point $a_0$. In order to know the sign of the real portion of the roots, it amounts to the same thing to know on what side the origin O of the coordinates is located with relation to the curve 215 passing through the abscissa point $a_0$ or to know on which side the abscissa point $-a_0$ is located with relation to a curve identical with the curve 215 and passing through the origin O obtained by a translation $-a_0$ from the curve 215. It is consequently provided to be able to place the converging point of the curves 211 to 219 either at the abscissa point $a_0$ or at the origin of the coordinates of the complex function plane. The translation of the different curves will be made, as will be explained below, by means of a switch 102.

Referring to Fig. 1, 100, 200, and 300 designate generally three oscillating circuits, each comprising a condenser, a first inductance and a resistance in parallel with a second inductance. The circuit 100 is composed of the condenser 11, the resistance 12 in parallel with the inductance 13 and the inductance 14. The circuit 200 comprises the condenser 21, the resistance 22 in parallel with the inductance 23 and the inductance 24. The circuit 300 comprises the condenser 31, the resistance 32 in parallel with the inductance 33 and the inductance 34.

Each of the circuits comprises a three-way switch having the contacts 10, 10′ and 10″ for the circuit 100, 20, 20′ and 20″ for the circuit 200, and 30, 30′ and 30″ for the circuit 300. The median position of each switch is an idle position, the left hand position 10′, 20′ and 30′ is an operative position used for charging the condenser of the respective circuits and the right hand position 10″, 20″ and 30″ is an operative position used for the oscillating discharge of the circuits.

Two potentiometers 5 and 45 are both fed by closing contact key 6 from the same battery 7 having, for example, an electromotive force of 100 volts. The positive terminal 41 of the potentiometer 5 is permanently connected to the plate 18 of the condenser 11 by the connection 50.

Upon the potentiometer 5 there can slide with overlapping four sliders 1, 2, 3, and 4. Upon the potentiometer 45 there can slide with overlapping three sliders 42, 43, and 44. The difference in potential between the terminal 41 and the slider 1 represents the coefficient $a_1$ of the polynomial. The difference in potential between the terminal 41 and the sliders 2, 3, and 4 represent respectively the coefficients $a_2$, $a_3$ and $a_0$ when the latter have the same sign as $a_1$. The difference in potential between the terminal 40 and the sliders 42, 43, and 44 represent respectively the coefficients $a_2$, $a_3$, and $a_0$ when the latter have a sign opposite to $a_1$.

When the switch 10 is in position 10′, the plate 19 of the condenser 11 is brought to the potential of the slider 1 by the slide 51 of such slider and the connections 57 and 55. The condenser 11 is charged with a voltage proportional to $a_1$ (it is assumed that $a_1$ is positive which is always permitted in multiplying if it is necessary the first member of the polynomial (4) by −1).

When the switch 20 is in position 20′ and as the coefficient $a_2$ is positive, the plate 28 of the condenser 21 is brought to the potential of the positive terminal 41 by the connections 58 and 59, the movable contact 61 of the switch 48 in its upper position, and the connection 60. The plate 29 is brought to the potential of the slider 2 by the slide 52 of the slider, the connection 65, the movable contact 66 of the switch 48 in its upper position and the connection 67.

When the switch 20 is in position 20′ and as the coefficient $a_2$ is negative, the plate 28 of the condenser 21 is brought to the potential of the negative terminal 40 of the battery through the connections 68 and 69, the movable contact 61 of the switch 48 in its lower position and the connection 60. The plate 29 is brought to the potential of the slider 42 by the slide 62 of such slider, the connection 161, the movable contact 66 of the switch 48 in its lower position and the connection 67.

It is the same when the switch 30 is in position 30′ and as the coefficient $a_3$ is positive, the plate 38 of the condenser 31 is brought to the potential of the positive terminal 41 by the connections 58 and 72, the movable contact 71 of the switch 49 being in its upper position and the connection 70. The plate 39 is brought to the potential of the slider 3 by the slide 53 of such slider, the connection 75, the movable contact 76 of the switch 49 being in its upper position and the connection 77.

When the switch 30 is in position 30′ and as the coefficient $a_3$ is negative the plate 38 of the condenser 31 is brought to the potential of the negative terminal 40 by the connections 68 and 79, the movable contact 71 of the switch 49 being in its lower position and the connection 70. The plate 39 is brought to the potential of the slider 43 by the slide 63 of such slider, the connection 73, the movable contact 76 of the switch 49 being in its lower position and the connection 77.

Finally, according to whether the switch 150 is in its upper or lower position, the movable contact 74 of such switch is connected either by the connection 85 to the slide 54 of the slider 4 or by the connection 84 to the slide 64 of the slider 44 and the movable contact 78 is connected either by the connections 58 and 82 to the positive terminal 41 or by the connections 68 and 86 to the negative terminal of the battery. One disposes therefore between the movable contacts 74 and 78 of the switch 150 a potential difference either equal to that of the slider 4 with relation to the positive pole 41 of the battery 7 (which represents the positive coefficient $a_0$) or equal to that of slider 44 with relation to the negative pole 40 (which represents the negative coefficient $a_0$).

Fig. 11 shows the potentiometer 5. The potentiometer 45 is similar thereto but possesses one less slider.

The potentiometer wire 99 is wound upon a cylindrical body 89 fixed at its two ends to two mounts 90 and 91. Upon these mounts are fixed the terminals 41 and 92 to which are soldered the ends of the wire 99 and to which are connected the poles of the battery 7.

The mounts 90 and 91 are connected by a metallic rule 93 which forms the base of the potentiometer and which is graduated upon its upper portion into 100 divisions. Four conducting slides, of which only three are shown, 51, 52, and 53 are fixed to the two mounts and terminate upon mount 91 in the terminals 94, 95, 96 and 97 to which are fixed respectively the connections 57, 65, 75 and 85. Upon the slides 51, 52, 53 and 54 (the latter not shown in Fig. 11) the sliders 1, 2, 3 and 4 can be respectively displaced (the latter is not shown in Fig. 11). The sliders have pointers attached thereto such as 98 which are displaced in front of the graduated rule 93 which allows positioning them opposite a given graduation.

In order to position the sliders one considers what is (or what are) in the polynomial (4) the highest coefficient in absolute value. One finds:

$$a_1 = a_0 = 16$$

The sliders 1 and 4 are placed upon the graduation 100, the slider 2 upon the graduation $$6 \cdot \frac{100}{16} = 37.5$$

and the slider 3 upon the graduation $$\frac{100}{16} = 6.25$$

If all the coefficients are positive the switches 48, 49 and 150 are in their upper position. If certain coefficients are negative, for example $$a_3 = 1 \qquad a_2 = -6 \qquad a_1 = 16 \qquad a_0 = -16$$

the slider 1 should be placed upon the graduation 100, the slider 42 upon the graduation 37.5 with the switch 48 in its lower position, the slider 3 upon the graduation 6.25 with the switch 49 in its upper position and the slider 44 upon the graduation 100 with the switch 150 in its lower position.

In each discharge circuit 100, 200, or 300, the inductance 13, (or 23, or 33) has a very strong impedance with relation to the resistance 12 (or 22, or 32) and only intervenes in order to obtain at its terminals a voltage in phase with the discharge current, while the voltage at the terminals of 14 is in quadrature with the discharge current. The assembly of a resistance, such as 12, in parallel with an inductance, such as 13, can be considered as having an impedance practically equal to the resistance 12.

Assuming therefore in the circuit 100, $R_1$ as the value of resistance 12, $L_1$ the value of inductance 14, $C_1$ the capacity of the condenser 11, we have:

$$\frac{R_1}{2L_1} = \alpha_1$$

$$\frac{1}{L_1 C_1} = \omega_1^2$$

where $\alpha_1$ is the attenuation coefficient of the discharge current and $\omega_1$ its angular velocity.

It is the same in circuits 200 and 300:

$$\frac{R_2}{2L_2}=\alpha_2$$

$$\frac{R_3}{2L_3}=\alpha_3$$

$$\frac{1}{L_2C_2}=\omega_1^2$$

$$\frac{1}{L_3C_3}=\omega_3^2$$

where $R_2$, $R_3$, $L_2$, $L_3$, $C_2$, $C_3$ are respectively the values of the elements 22, 32, 24, 34, 21, 31; $\alpha_2$, $\alpha_3$ the attenuation factors and $\omega_2$, $\omega_3$ the angular velocities of the circuits 200 and 300.

It is arranged by construction in order that $$\frac{\alpha_3}{3}=\frac{\alpha_2}{2}=\frac{\alpha_1}{1} \quad (5)$$

$$\frac{\omega_3}{3}=\frac{\omega_2}{2}=\frac{\omega_1}{1} \quad (6)$$

that is, in order that in all the circuits the quotient $$\frac{\alpha}{\omega}$$

which is equal to the product of the logarithmic decrement $\delta$ of the oscillations by the factor $$\frac{1}{2\pi}$$

may be constant.

The Equations 5 and 6 can be realized by acting in each circuit upon the three parameters, the capacity C, the resistance R and the inductance L. One can take for example:

$$C_3=C_2=C_1$$
$$(3)^2L_3=(2)^2L_2=(1)^2L_1$$
$$3R_3=2R_2=R_1$$

If therefore after having thrown the switches 10, 20, and 30 towards the left in order to charge the condensers 11, 21, and 31 under voltages respectively proportional to the algebraic values $a_1$, $a_2$, and $a_3$, one throws them towards the right, the circuits 100, 200, and 300 are the seats of oscillating discharges and the discharge currents in the three circuits, will be, with the exception of a coefficient constant of proportion, equal to:

$$i_1=a_1e^{-\alpha t}\cos\omega t$$

$$i_2=a_2e^{-2\alpha t}\cos 2\omega t$$

$$i_3=a_3e^{-3\alpha t}\cos 3\omega t$$

The winding 14 of the circuit 100 is coupled to a first secondary winding 16, the winding 24 of the circuit 200 to a first secondary winding 26 and the winding 34 of the circuit 300 to a first secondary winding 36. The transformation ratios of the transformers constituting the windings 14 and 16, 24 and 26, 34 and 36 are the same. The secondary windings 16, 26, and 36 are placed in series and the voltages developed at their terminals are applied additively by means of the connections 89 and 83, to the horizontal deflection plates 46 of a cathode ray tube 101. The voltage at the terminals of the primary windings 14, 24, and 34 is as indicated in quadrature with the discharge current. The voltage developed at the terminals of each of the secondary windings 16, 26, and 36 is therefore also in quadrature with the discharge current of the corresponding circuit and the voltage applied between the plates 46 is under these conditions equal, with the exception of a proportion factor, to $$(7)\quad Q=a_3e^{-3\alpha t}\sin 3\omega t+a_2e^{-2\alpha t}\sin 2\omega t+a_1e^{-\alpha t}\sin\omega t$$

that is to the imaginary portion of $f(p)$.

The winding 14 of the circuit 100 is coupled to a second secondary winding 15, the winding 24 of the circuit 200 to a second secondary winding 25 and the winding 34 of the circuit 300 to a second secondary winding 35. The winding 13 of the circuit 100 is coupled to a secondary winding 17, the winding 23 of the circuit 200 to a secondary winding 27 and the winding 33 of the circuit 300 to a secondary winding 37. The secondary windings 17, 15, 27, 25, 37, 35 are placed in series and the voltages developed at their terminals are applied additively with the voltage existing between the movable contacts 74 and 78 which is proportional to the algebraic value of $a_0$, across the connections 81, 87, and 80 to the vertical deflection plates 47 of the cathode ray tube 101. The voltage at the terminals of each of the primary windings 13, 23, and 33 is as indicated almost in phase with the corresponding discharge current. The voltage at the terminals of each of the secondary windings 17, 27 and 37 is consequently almost in phase opposition with the corresponding discharge current. The voltage at the terminals of each of the primary windings 14, 24, and 34 is in quadrature with the corresponding discharge current. The voltage at the terminals of each of the secondary windings 15, 25, and 35 is consequently also in quadrature with the corresponding discharge current. The secondary windings 15, 25 and 35 have only a small number of wire turns so that the voltage in quadrature that they introduce compensates the voltage in quadrature introduced by the secondary windings 17, 27 and 37 and two transformers, such as 15 and 17, introduce a resultant voltage exactly in phase with the corresponding discharge current. The voltage applied between the plates 47 is under these conditions equal, with the exception of a proportion factor, to:

$$(8)\quad P=a_3e^{-3\alpha t}\cos 3\omega t+a_2e^{-2\alpha t}\cos 2\omega t+a_1e^{-\alpha t}\cos\omega t+a_0$$

that is, to the real portion of $f(p)$.

In the preceding explanations the switch 102 which connects the wires 80 and 87 is supposed to be open. If this switch is closed one cancels in the above expression (8) the term $a_0$.

If in place of throwing the three switches 10, 20, and 30 towards the right one should only throw the switch 10 towards the right and if the switch 102 is closed which eliminates the placing in series with the plates 47 of a voltage proportional to $a_0$ the voltages applied to the pairs of plates 47 and 46 will be respectively:

$$(9)\quad \begin{cases} a_1e^{-\alpha t}\cos\omega t \\ a_1e^{-\alpha t}\sin\omega t \end{cases}$$

The spot describes upon the screen a logarithmic spiral whose first expression (9) represents the abscissa and the second expression the ordinate and which makes with its radius victor an angle $\psi$ thus that $$(10)\quad \tan\psi=-\frac{\omega}{\alpha}=-\frac{2\pi}{\delta}$$

(see Schelkunoff cited).

This logarithmic spiral is the spiral 240 of Fig. 8.

Figure 2:
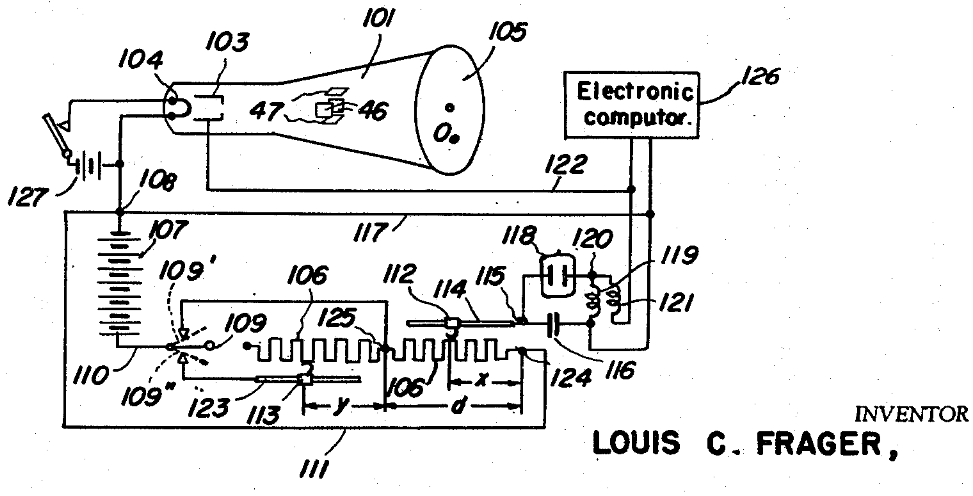
Figure 2 shows the diagram of a device for generation of isochronous pulses and a cathode ray tube.

Fig. 2 represents a circuit designed to illuminate periodically the spot of the cathode ray tube 101. This circuit may produce impulses of positive polarity at recurrent frequency and with variable phase. Such circuits are well known in the art and that of Fig. 2 is only shown for illustrative purposes.

Figure 1:
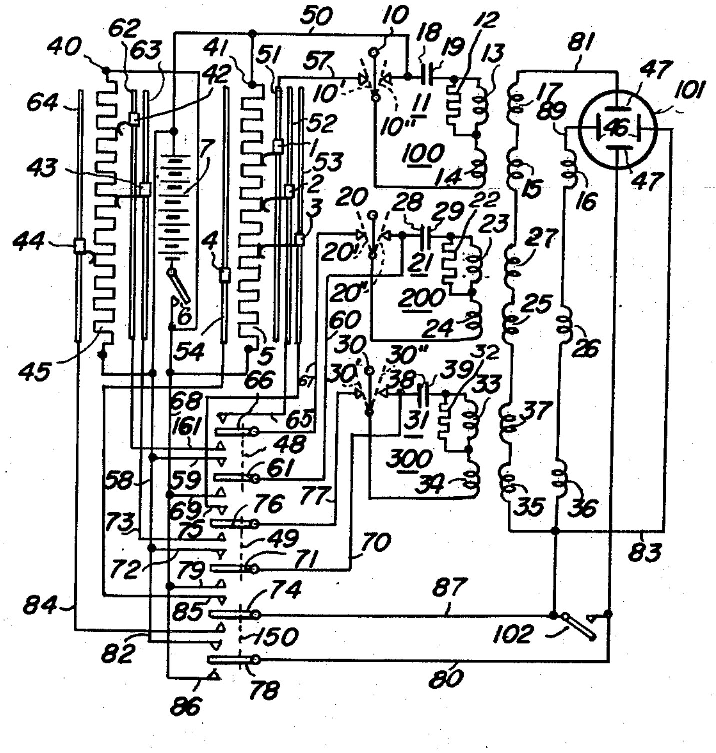
Figure 1 represents the diagram of the electric resonant circuits used for generation of voltages which are to be composed together, as well as the potentiometer enabling to adjust the initial voltages in condensers of said resonant circuits.

101 is the cathode ray tube shown in Fig. 1, 104 is the cathode heated by the battery 127, 103 is the grid, 105 the screen, 46 the horizontal deflection plates and 47 the vertical deflection plates.

The potentiometer 106 is fed by the battery 107 through the connections 110 and 111 and the three-way switch 109. The potentiometer 106 comprises two sliders 112 and 113. The slide 114 of the slider 112 is connected by the connection 115 to one of the plates of a condenser 116 whose other plate is connected by the connection 117 to the negative terminal 108 of the battery.

The condenser 116 is shunted by a neon tube 118 and the primary winding 119 of a transformer. The secondary winding 121 of such transformer is connected at one terminal to the point 120 at the junction of the neon tube 118 and the primary winding 119 and, by its other terminal, to the grid 103 by the connection 122. The switch 109 has one median idle position and two operative positions, the one 109′ where the connection 110 is connected to the potentiometer 106 and the other 109″ where the connection 110 is connected to a slide 123 of the slider 113.

When switch 109 passes from the median position to the upper position 109′, the condenser 116 is charged exponentially starting from a zero value to the potential difference existing between the slider 112 and the point 108. When the voltage at the terminals of 116 reaches the value of the disruptive voltage of the neon tube 118, the condenser discharges into such tube. There results therefrom a voltage surge at the terminals of the primary 119 and at the terminals of the secondary 121 and the sum of these voltage surges is applied by the connection 122 to the grid 103. This grid is normally at the potential of the point 108. During the appearance of the voltage surge at the terminals of 119 and 121 it is carried to a positive potential with relation to the point 108 and the electronic beam of the tube 101 is unblocked for a short instant. The repetition period of the positive impulses applied to the grid 103 may be varied by displacing the slider 112 upon the potentiometer 106.

Let us assume that the battery 107 has an electromotive force E.

Let us designate by $d$ the distance between the end 124 of the potentiometer 106 connected to the negative terminal of the battery 107 and the point 125 connected to the positive terminal of the battery 107 when the switch 109 is in position 109′. Let us designate by $x$ the distance between the point 124 and the slider 112. When the switch 109 passes from its median inoperative position to the position 109′ the condenser 116 is discharged with a voltage $$E\frac{x}{d}$$

and this charge stops before reaching such value when the increasing voltage at the terminals of 116 becomes equal to the disruptive voltage of the tube 118.

Let us designate by $y$ the distance between the point 125 and the slider 113 and let us suppose the switch is in position 109″. The condenser 116 is then charged with a voltage $$E\frac{x}{d+y}$$

which is assumed to be smaller than the disruptive voltage of the tube 118. If one sharply swings the switch 109 from its position 109″ to its position 109′ condenser 116, already charged under a voltage equal to $$E\frac{x}{d+y}$$

will be further charged under a supplemental voltage equal to $$E\frac{x}{d}$$

and will reach the disruptive voltage of the tube 118 at the end of a shorter time than if the charge had started from zero. The position of the slider 113 along the slide 123 therefore allows varying the instant of the appearance of the first positive impulse upon the grid 103 starting from the moment of swinging the switch 109.

An electronic computer 126 allows counting the number of impulses applied to the grid 103 starting from the swinging of the switch 109.

The operation of the apparatus is therefore the following:

One positions the slider 1, and those of the sliders 2, 3 and 4 which correspond to the positive coefficients of the polynomial and those of the sliders 42, 43, and 44 which correspond to the negative coefficients, while taking care to associate with a positive coefficient a slider of the potentiometer 5 and a switch 48, 49, or 150 in the upper position and with a negative coefficient a slider of the potentiometer 45 and a switch 48, 49 or 150 in a lower position.

This being done, and the switch 102 being in closed position, one swings the switch 10 towards the left into the position 10′ to charge the condenser 11 under a voltage proportional to $a_1$ and one swings simultaneously the switches 10 and 109 into the respective positions 10″ and 109′. The spot if it was constantly illuminated would describe a logarithmic spiral such as 240 of Fig. 8 or 340 of Fig. 10, but in fact as it is illuminated only at regular intervals one observes a series of points 301, 302, 303, 304, (Fig. 10) located in any way whatsoever upon the spiral 340. The preceding operations are recommenced several times while modifying at each time the position of the slider 112 until the points observed become aligned with the center Oo of the screen 105 such as shown at 301, 310, 320, 330.

The repetition period of the periodic illuminations of the screen being determined by a suitable positioning of the slider 112 there is carried out successively the following pairs of operations, for different positions of the slider 113:

First operation: the switches 10 and 109 are swung into the positions 10′ and 109″ to charge the condenser 11 and to adjust to a given value the phase of the illuminations of the spot. Then, the switch 102 being closed one swings said switches into the positions 10″ and 109′ and one observes upon the screen an alignment of points upon a given line of inclination such as the lines 201 to 209 of Fig. 8 or 351, 352 of Fig. 10. A circular degree scale 304 is provided upon the circumference of the screen 105 (Fig. 10) in order to measure the inclination of said alignment.

Second operation: the switches 10, 20, 30, and 109 are swung into the positions 10′, 20′, 30′ and 109″, to charge the condensers of the oscillating circuits and the condenser 116 under a certain preliminary charge, and then, the switch 102 being then open, the same switches are swung into the positions 10″, 20″, 30″ and 109′. There will then be observed upon the screen a series of points located upon a curve such as the curves 211 to 219 of Fig. 9.

The preceding two operations are repeated for different positions of the slider 113 until there is obtained a curve such as 217 passing through the center Oo of the screen. Thus it is deduced therefrom as has been seen that the line 207 whose curve 217 is the corresponding transformation passes through a root and having noted upon the scale 304 the inclination of the line 207 the argument of said root is known.

It is necessary to be able to verify that the angular velocity of the circuits 100, 200, and 300 are in arithmetical progression and that their logarithmic decrements are equal.

As Equation 10 shows, the spiral described by the spot is the same if one discharges only one of the circuits 100, 200 or 300 upon condition that the logarithmic decrements are indeed equal. In fact the angle $\psi$ that makes the spiral with its radius vector only depends upon the logarithmic decrement of the circuits.

In order to make the preceding verification one charges the condensers 11, 21, and 31 under the same voltage, that is, one positions the sliders 1, 2 and 3 upon the same graduation of the rule 93 and one closes the switch 102. Then one discharges the different circuits one after another for the same position of the slider 113. The period of scintillation being the same but the angular rotational speed of the spot being double for the circuit 200 than for the circuit 100, and triple for the circuit 300 and the spiral described in each case being identical, one may observe:

When one discharges the circuit 100 alone, a series of points 301, 310, 320, 330 aligned upon the line 351;

When one discharges the circuit 200 alone, only one point out of two, namely: 301, 320.

When one discharges the circuit 300 alone, only one point out of three, namely: 301, 330.

In order to know the modulus of the root placed into evidence upon a given line of the argument such as 207, one counts in an electronic computer 126 of a known type the number of impulses applied to the grid 103 starting from the beginning of the discharge.

As the modulus of the complex variable is represented by $e^{-\alpha t}$ and as $\alpha t$ is between $$\frac{2\pi n\alpha}{\omega} \text{ and } \frac{2\pi(n+1)\alpha}{\omega}$$

$n$ being the number of the point illuminated upon the curve 217 immediately preceding the origin O and $n+1$ the number of the illuminated point upon the curve 217 immediately following this same origin, the quantity $$e^{\frac{-2\pi n\alpha}{\omega}}$$

represents the modulus of the root with an absolute error almost corresponding to the interval between two scintillations. If as is the case upon Fig. 9 an illuminated point (point 235) coincides exactly with the origin and if N is the number of such illuminated point from the beginning of the discharge, $$e^{\frac{-2\pi N\alpha}{\omega}}$$

represents exactly the modulus of the root.

Figure 3:
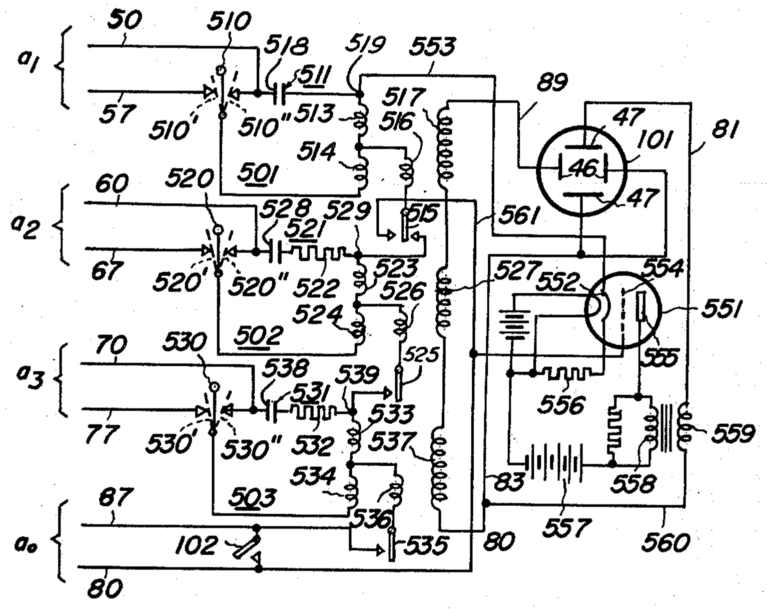
Figure 3 shows an alternative embodiment of the computor device according to Figure 1.

In the example of Fig. 3, it has been sought to realize a group of three oscillating circuits whose attenuation factor may be as slight as possible at the same time as a good setting into quadrature of the voltages which feed the pairs of plates 46 and 47.

One knows that in a free oscillating circuit in exponential form, composed of a self inductance L, a capacity and a resistance R, the voltage at the terminals of the self-inductance comprises a real term due to the restitution of the energy brought about by the lowering of the energetic level of the system. This is to say that the current $e^{-\alpha t}e^{j\omega t}$ traversing the inductance L does not produce a fall in voltage $jL\omega e^{-\alpha t}e^{j\omega t}$ but a fall in voltage:

$$(11)\quad (-\alpha+j\omega)Le^{-\alpha t}e^{j\omega t}=\left(-\frac{R}{2L}+j\omega\right)Le^{-\alpha t}e^{j\omega t}$$

The real term $$-\frac{R}{2}e^{-\alpha t}e^{j\omega t}$$

can be cancelled if one adds thereto the fall of voltage in the semi-resistance of the circuit. In the case of a self inductance L, it is possible to exteriorize this fall of voltage by forming a winding having half the number of turns of that of the self inductance and a coupling without leakage with the latter.

Referring to Fig. 3, 501, 502 and 503 are three oscillating circuits having angular velocities in arithmetical progression and equal logarithmic decrements. The circuit 501 is formed of a condenser 511 and an inductance 513, 514 formed of two equal portions. The circuit 502 is formed of a condenser 521, a resistance 522 and an inductance 523, 524 also formed of two equal portions. The circuit 503 is formed of a condenser 531, a resistance 532 and an inductance 533, 534 also formed of two equal portions.

Each circuit has a three-way switch, the middle position being inoperative, the left hand position corresponding to the charging of the condenser of the circuit and the right hand position to the discharging of such condenser. These switches are 510 for the circuit 501, 520 for the circuit 502 and 530 for the circuit 503. The left hand position for such switches is indicated at 510′, 520′ and 530′ and the right hand position at 510″, 520″ and 530″.

The system of potentiometers and sliders for obtaining voltages proportional to the coefficients of the polynomial is the same as in the case of Fig. 1 and is not shown. It is schematized in the form of four pairs of leads, 50, 57; 60, 67; 70, 77 and 80, 87 so that between the two leads of a pair there is a voltage proportional to the algebraic value of a coefficient. The value of the coefficient is written opposite a bracket in Fig. 3 connecting the two leads of each pair.

The wire 50 is connected to the plate 518 of condenser 511, the wire 60 to the plate 528 of condenser 521 and the wire 70 to the plate 538 of condenser 531. The wire 57 is connected to the left hand contact of the switch 510, the wire 67 to the left hand contact of the switch 520 and the wire 77 to the left hand contact of the switch 530.

The cathode 552 of an amplifying tube 551 is connected by the connection 553 to the point 519 of the circuit 501. The median point of the inductance 513, 514 is connected by way of the coil 516 and the switch 515 to the point 529 of the circuit 502. The median point of the inductance 523, 524 is connected by way of the coil 526 and the switch 525 to the point 539 of the circuit 503. The median point of the inductance 533, 534 is connected by the coil 536 and the switch 535 to the connecting wire 87. The connecting wire 80 is connected to the grid 554 of the tube 551.

The switch 515 is a three position switch, the median position being inoperative, the left hand position connecting the output of the coil 516 directly to the grid 554 through the connection 561 and the right hand position connecting the output of the coil 516 to the point 529.

The coils 516, 526, 536 have a number of turns which are respectively half those of the windings 513, 514; 523, 524 and 533, 534 and are coupled without leakage to the latter.

One of the horizontal deflection plates 46 of the cathode ray tube 101 is connected by the connection 89 to one end of the chain of secondary windings 517, 527 and 537, respectively coupled with the primaries 513, 514; 523, 524 and 533, 534 and the other end of such chain is connected by the connection 83 to the other horizontal deflection plate 46.

The cathode 552 of the tube 551 is polarized by the resistance 556 and the plate 555 is fed by the battery 557. Moreover the anode circuit of 551 comprises a primary winding 558 which is coupled to a secondary winding 559 connected by the connections 81, 560, and 83 to the vertical deflection plates 47 of the cathode ray tube 101.

A switch 102 connected between the wires 80 and 87 prevents when closed the introduction in series upon the chain going from the cathode 552 to the grid 554 of the voltage proportional to the coefficient $a_0$.

The voltage at the terminals of the assembly formed by the primary 513 and the secondary 516 is in phase with the discharge current and equal to the product of said discharge current by the resistance of the windings 513 and 516. The self-inductance of 513 being $$\frac{L}{2}$$

the mutual inductance between 514 and 516 is, assuming the equality of the number of turns of 514 and 516 and their coupling without leakage, also equal to $$\frac{L}{2}$$

The voltage drop (see Equation 11) above, at the terminals of 514 is equal to the voltage drop at the terminals of 516, the real and imaginary portions of these voltage drops cancel by subtraction. There, therefore, remains only the voltage drop corresponding to the resistance of the assembly 513, 516 which is in phase with the discharge current. Likewise in the circuits 502 and 503 there will only remain respectively at the terminals of the assemblies 523, 526 and 533, 536 voltages in phase with the current.

If therefore the switches 515, 525, and 535 are closed (towards the right as regards switch 515) the voltage applied between the cathode and the grid of the tube 551 is proportional to the real portion of $f(p)$ given by the Equation 8. The voltage at the terminals of the deflection plates 47 is also proportional, with the exception of the sign, to such real portion.

The voltage at the terminals of the secondaries 517, 527, and 537 is in quadrature with the discharge current in the corresponding circuit. The voltage at the terminals of the deflection plates 46 is proportional to the imaginary portion of $f(p)$ given by the Equation 7.

The operation for solving an equation by the device of Fig. 3 is almost similar to that for solving an equation by the construction of Fig. 1.

The switches 510, 520 and 530 being swung towards the left and the switches 515, 525 and 535 being open, the condensers are charged with voltages proportional to the coefficients of the polynomial.

If one swings the switch 510 towards the right and the switch 515 towards the left there is obtained upon the screen 105 a series of points marking out a line such as 201 to 209 of Fig. 8.

If one swings the switches 510, 520 and 530 and the switch 515 towards the right the switches 525 and 535 being closed and 102 being open, there is obtained upon the screen a series of points marking out a curve such as 211 to 219 of Fig. 9.

The search for the sign of the real portion of the roots and the value of the argument of the roots is made by displacing the slider 113 as has been indicated. The determination of the value of the modulus is made in a way exactly similar to that set forth precedingly and it is not necessary to repeat the explanations already made.

In the two applications which have just been described one has taken for the argument $\theta$ of the variable $p$ the quality $\omega t$ variable as a function of the time. Whence it is necessary in order to obtain the corresponding transformation in the plane of $f$, of a radius vector in the plane of $p$ having a given $\theta$, having as its period to introduce a recurrent stroboscopic effect $$\frac{2\pi}{\omega}$$

by means of synchronized scintillations.

In the third application which is now going to be described with relation to Fig. 4 the vector representing the variable $p$ is no longer a rotating vector and the discharge circuits are no longer oscillating but aperiodic.

Upon Fig. 4, 401, 402, 403, 451, 452 and 453, are six similar aperiodic circuits (401 being identical with 451, 402 with 452 and 403 with 453). They each comprise a condenser 411, 421, 431, 461, 471 and 481 respectively and a potentiometer resistance 412, 422, 432, 462, 472, and 482 respectively. The time constant of the circuits 402 and 452 is two times smaller than the time constant of the circuits 401 and 451 and that of the circuits 403 and 453 is three times smaller. This result can be obtained either by giving to the condensers 421 and 471 a value two times smaller than to the condensers 411 and 461 and to the condensers 431 and 481 a value three times smaller, the resistances being equal in all the circuits, or by giving to the resistances 422 and 472 a value two times smaller than to the resistances 412 and 462 and to the resistances 432 and 482 a value three times smaller, the condensers being equal in all the circuits.

Each circuit comprises a three position switch, the median position being inoperative, the left hand position corresponding to the charging of the condenser in the circuit and the right hand position to the discharging of the condenser. These switches are 410 and 460 for the circuits 401 and 451, 420 and 470 for the circuits 402 and 452, 430 and 480 for the circuits 403 and 453. The left hand positions are indicated at 410′, 460′, 420′, 470′, 430′ and 480′ and the right hand positions at 410″, 460″, 420″, 470″, 430″ and 480″.

The system of potentiometers and of sliders for obtaining voltages proportional to the coefficients of the polynomial is the same as in the case of Fig. 1 and is not shown. It is schematized in the form of four pairs of leads 50, 57; 60, 67; 70, 77; and 80, 87, such that between the two leads of a pair there is a voltage proportional to the algebraic value of a coefficient. The value of the coefficient is written opposite a bracket connecting the two leads of each pair.

The wire 50 is connected to the plates 418 and 468 of the condensers 411 and 461, the wire 60 to the plates 428 and 478 of the condensers 421 and 471, the wire 70 to the plates 438 and 488 of the condensers 431 and 481.

The wire 57 is connected to the left hand contacts of the switches 410 and 460, the wire 67 to the left hand contacts of the switches 420 and 470, the wire 77 to the left hand contacts of the switches 430 and 480.

Upon the potentiometers 412, 422, 432, 462, 472 and 482, are displaced the sliders 413, 423, 433, 463, 473, and 483 respectively and their respective displacements are combined in such a way as to pick up ($\theta$ being a predetermined angle):

Upon the circuit 401 a fraction proportional to $\cos\theta$

Upon the circuit 402 a fraction proportional to $\cos 2\theta$

Upon the circuit 403 a fraction proportional to $\cos 3\theta$

Upon the circuit 451 a fraction proportional to $\sin\theta$

Upon the circuit 452 a fraction proportional to $\sin 2\theta$

Upon the circuit 453 a fraction proportional to $\sin 3\theta$ of the total voltage at the terminals of the resistance of the circuit.

One of the vertical deflection plates 47 of the cathode ray tube 101 is connected to the point 414 of the circuit 401 through the connection 81, the slider 413 to the point 424 of the circuit 402 by means of a switch 415, the slider 423 to the point 434 of the circuit 403 by means of a switch 425 and the slider 433 to the connection 87 by means of a switch 435. The connection 80 is connected to the other vertical deflection plate 47.

One of the horizontal deflection plates 46 of the cathode ray tube 101 is connected to the point 464 of the circuit 451 through the connection 89, the slider 463 to the point 474 of the circuit 452 by means of a switch 465, the slider 473 to the point 484 of the circuit 453 by means of a switch 475 and the slider 483 to the other horizontal deflection plate 46 by means of a switch 485 and a connection 83.

The switches 415 and 465 are three position switches, the median position being inoperative, the left hand one is that in which a connection is established between the slider 413 or 463 and point 424 or 474 and the right hand one that in which a connection is established between the slider 413 and the connection 80 and between the slider 463 and the connection 83.

The switch 102 when in the closed position as in the case of Fig. 1, prevents the insertion in series between the plates 47 of the voltage proportional to the term $a_0$ which is available between the input leads 80 and 87.

The discharge currents in the circuits 401 and 451, 402 and 452, 403 and 453 are respectively proportional to:

$$a_1e^{-\alpha t}$$

$$a_2e^{-2\alpha t}$$

$$a_3e^{-3\alpha t}$$

where $\alpha$ designates the inverse of the time constant of the circuits 401 and 451.

Figs. 5, 6 and 7 show the system for placing into place simultaneously the sliders upon the potentiometers. A knob 493 fixed upon a shaft 490 has a pointer 492 which is movable in front of a dial 491 graduated in angles $\theta$. Upon Fig. 5 for example the pointer is opposite the graduation $\theta=20$.

Upon the shaft 490 (Fig. 6) are mounted three gears 469, 479 and 489 which mesh respectively with the gears 419, 429, and 439. The gearing ratio between the gears 469 and 419 is equal to unity, the gearing ratio between the gears 479 and 429 is twice that and the gearing ratio between the gears 489 and 439 is triple that.

The gears 419, 429 and 439 carry crank pins 417, 427, and 437 respectively which actuate respectively and by pairs the connecting rods 416 and 466, 426 and 476, 436 and 486.

The connecting rod 416 drives the slider 413 which slides on the guide 404 and the connecting rod 466 drives the slider 463 which slides on the guide 454 (Fig. 7). The length of the connecting rods is sufficiently large in order that their inclination with relation to the guides may be negligible. The sliders 413 and 463 slide along the potentiometers 412 and 462 which are linear and are located at right angles to one another. Under these conditions there is received upon the sliders 413 and 463 voltages respectively proportional to the fractions $\cos\theta$ and $\sin\theta$ of the voltage at the terminals of the potentiometers 412 and 462.

The same assemblage which has just been described for the circuits 401 and 451 and as shown in Fig. 7 is similarly provided for the circuits 402 and 452 on one hand and 403 and 453 on the other hand. The only difference is the following:

When the knob 493 is displaced so that the pointer 492 leaves the zero graduation and is placed opposite to the mark $\theta$, the crank pin 417 rotates for an angle $\theta$ but the crank pin 427 rotates for an angle $2\theta$ and the crank pin 437 rotates for an angle $3\theta$ because of the gearing ratios of the gears 479, 429 on one hand and 489, 439 on the other hand. The voltages received will therefore be proportional to $\cos 2\theta$ upon the slider 423, $\sin 2\theta$ upon the slider 473, $\cos 3\theta$ upon the slider 433, and $\sin 3\theta$ upon the slider 483.

It is clear under these conditions that during the discharge of the circuits, the voltage applied between the plates 47 is no other than the real portion of $f(p)$ given by the Equation 8 (switch 102 open) and that the voltage applied between the plates 46 is no other than the imaginary portion of $f(p)$ given by the Equation 7.

The operation of the device of Fig. 4 is then as follows:

In order to charge the condensers of the circuits the switches 410, 420, 430, 460, 470 and 480 are swung into the positions 410′, 420′, 430′, 460′, 470′ and 480′ with the switches 415, 425, 435, 465, 475 and 485 in open position. Then the knob 493 is turned to place the pointer 492 opposite a given graduation $\theta$. Then the switches 415 and 465 and the switches 410 and 460 are swung towards the right. There is then observed upon the screen 105 of the cathode ray tube 101 one of the lines 201 to 209 of Fig. 8 according to the value of $\theta$. But instead of the lines being marked off by a discrete series of luminous points, they appear as a continuous line. If $$\theta=\frac{\pi}{2}$$

for example, one will observe upon the screen the line 205.

Then the condensers 411 and 461 are recharged and simultaneously the switches 415, 425, 435, 465, 475, and 485 are closed (towards the left as regards the switches 415 and 465) and at the same time one swings towards the right the switches of all the circuits. One may note that all the switches 415, etc. which may be termed "adding switches" may remain open when the switches 410, etc. which may be termed "circuit switches" are in charging position and may be closed when the circuit switches are in discharging position. One observes then upon the screen 105 of the cathode ray tube 101 one of the curves 211 to 219 of Fig. 9, for example the curve 215 if one has taken as assumed $$\theta=\frac{\pi}{2}$$

But instead of the curves being marked off by a discrete series of luminous points they appear as a continuous line. The center $O_0$ of the screen 105 being at the left of the curve 215 one deduces therefrom that the polynominal has roots with a real portion negative.

One recommences the preceding operations during the course of which the screen 105 appears successively as the plane of the complex variable $p$ and as the plane of the complex function $f$, for different values of $\theta$ until a curve is obtained passing through the center $O_0$ of the screen. The corresponding angle $\theta$ is then the argument of a root.

In order to secure the modulus of such root, a chronometer is started at the beginning of the discharge, that is at the moment when all the adding switches being closed and the switch 102 open one swings all the discharging switches towards the right and one stops such chronometer at the moment when the spot describing the curve passes through the center $O_0$ of the screen. Let $t_s$ be the time registered. One has: $\rho s=e^{-\alpha t_s}$ from which $\rho s$ by logarithmic calculation.

Although the invention has been described with specific examples of application it is possible to make therein various variations which are easily developed by a worker in this art and which can be considered as coming within the scope of the invention.

What I claim is:

1. A computing device for determination of the roots of polynomials and of the sign of the real portion of the same comprising in combination a first circuit corresponding to the variable of the polynomial to be solved and comprising at least a first resistor and a first capacitor, a second circuit corresponding to the square of the variable and comprising at least a second resistor having a value equal to half the value of the first resistor and a second capacitor, a $n$th circuit corresponding to the $n$th power of the variable and comprising at least a $n$th resistor having a value equal to the $n$th fraction of the first resistor, and a $n$th capacitor, whereby all the circuits have attenuation factors proportional to the terms of an arithmetic series of a ratio 1, commutation means for respectively charging the capacitors of these circuits under voltages proportional to the constant coefficients of the first, second, $n$th powers of the variable in the polynomial to be solved, commutation means for simultaneously discharging the capacitors of said circuits, means for picking-up a first fraction of the discharge current of the first circuit equal to the cosine of a given angle and a second fraction of said discharge current equal to the sine of the said angle, means for picking-up a first fraction of the discharge current of the second circuit equal to the cosine of two times the given angle and a second fraction of said discharge current of the second circuit equal to the sine of two times the given angle, means for picking-up a first fraction of the discharge current of the $n$th circuit equal to the cosine of $n$ times the given angle and a second fraction of said discharge current of the $n$th circuit equal to the sine of $n$ times the given angle, means for obtaining a first sum of voltages comprising the voltage fractions equal to the cosine of the given angle and to the cosines of its integer multiples and a D. C. voltage proportional to the constant coefficient of the polynomial, means for obtaining a second sum of voltages comprising the voltage fractions equal to the sine of the given angle and to the sines of its integer multiples, a cathode ray tube, means for applying the first sum of voltages to the first pair of deflecting plates and the second sum of voltages to the second pair of deflecting plates of said cathode ray tube, means for varying the given angle until the curve drawn by the spot on the tube screen passes over the center of the screen and means for measuring the time interval between the beginning of the discharge and the passage over the center of the screen, whereby the phase of one root of the polynomial is equal to the angle for which the curve passes over the center of the screen and the modulus of said root is proportional to the logarithm of said interval.

2. A computing device for determination of the roots of polynomials and of the sign of the real portion of the same comprising in combination a first aperiodic circuit corresponding to the variable of the polynomial to be solved and comprising a first resistor and a first capacitor, a second aperiodic circuit corresponding to the square of the variable and comprising a second resistor having a value equal to half the value of the first resistor and a second capacitor, a $n$th aperiodic circuit corresponding to the $n$th power of the variable and comprising a $n$th resistor having a value equal to the $n$th fraction of the first resistor, and a $n$th capacitor, whereby all the circuits have time constants proportional to the terms of an arithmetic series of ratio 1, commutation means for respectively charging the capacitors of these circuits under voltages proportional to the constant coefficients of the first, second, $n$th powers of the variable in the polynomial to be solved, commutation means for simultaneously discharging the capacitors of said circuits, potentiometric means for picking-up a first fraction of the discharge current of the first circuit equal to the cosine of a given angle and a second fraction of said discharge current equal to the sine of the said angle, potentiometric means for picking-up a first fraction of the discharge current of the second circuit equal to the cosine of two times the given angle and a second fraction of said discharge current of the second circuit equal to the sine of two times the given angle, potentiometric means for picking-up a first fraction of the discharge current of the $n$th circuit equal to the cosine of $n$ times the given angle and a second fraction of said discharge current of the $n$th circuit equal to the sine of $n$ times the given angle, means for obtaining a first sum of voltages comprising the voltage fractions equal to the cosine of the given angle and to the cosines of its integer multiples and a D. C. voltage proportional to the constant coefficient of the polynomial, means for obtaining a second sum of voltages comprising the voltage fractions equal to the sine of the given angle and to the sines of its integer multiples, a cathode ray tube, means for applying the first sum of voltages to the first pair of deflecting plates and the second sum of voltages to the second pair of deflecting plates of said cathode ray tube, potentiometric means for varying the given angle until the curve drawn by the spot on the tube screen passes over the center of the screen and means for measuring the time interval between the beginning of the discharge and the passage over the center of the screen, whereby the phase of one root of the polynomial is equal to the angle for which the curve passes over the center of the screen and the modulus of said root is proportional to the logarithm of said time interval.

3. A computing device for determination of the roots of polynomials and of the sign of the real portion of the same comprising in combination a first oscillatory circuit coresponding to the variable of the polynomial to be solved and comprising a first resistor, a first capacitor and a first inductance, a second oscillatory circuit corresponding to the square of the variable and comprising a second resistor having a value equal to half the value of the first resistor, a second capacitor and a second inductance having a value equal to the fourth of the value of the first inductance, a $n$th oscillatory circuit corresponding to the $n$th power of the variable and comprising a $n$th resistor having a value equal to the $n$th fraction of the first resistor, a $n$th capacitor and a $n$th inductance having a value equal to the square of the $n$th fraction of the first inductance, whereby all the circuits are oscillatory circuits having attenuation factors and frequencies proportional to the terms of an arithmetic series of a ratio 1, commutation means for respectively charging the capacitors of these circuits under voltages proportional to the constant coefficients of the first, second, $n$th powers of the variable in the polynomial to be solved, commutation means for simultaneously discharging the capacitors of said circuits, transformer means for respectively picking-up voltages proportional to and cophasal with the discharge currents of the circuits, transformer means for respectively picking-up voltages proportional to the discharge currents of the circuits and having a phase-shift of 90° with respect to the latter, means for obtaining a first sum of voltages comprising the voltages proportional to and cophasal with the discharge currents and a D. C. voltage proportional to the constant coefficient of the polynomial, means for obtaining a second sum of voltages comprising the voltages proportional to the discharge currents and having a phase-shift of 90° with respect to the latter, a cathode ray tube, means for applying the first sum of voltages to the first pair of deflecting plates and the second sum of voltages to the second pair of deflecting plates of said cathode ray tube, pulse generator means for periodically illuminating the spot of said cathode ray tube, said pulse generator having a recurrence frequency equal to the frequency of the first oscillatory circuit, means for varying the phase of the pulse generator with respect to the beginning of the simultaneous discharge until the curve drawn by the periodically illuminated spot upon the cathode ray tube screen passes over the center of the screen and means for measuring the time interval between the beginning of the discharge and the passage over the center of the screen, whereby the phase of one root of the polynomial is equal to the phase of the pulse generator with respect to the beginning of the dicharge for which the curve passes over the center of the screen and the modulus of said root is proportional to the logarithm of said time interval.

LOUIS C. FRAGER.

References Cited in the file of this patent

UNITED STATES PATENTS

| Number | Name | Date |
|---|---|---|
| 2,324,851 | Koch | July 20, 1943 |
| 2,349,437 | Keeler | May 23, 1944 |
| 2,454,549 | Brown | Nov. 23, 1948 |

FOREIGN PATENTS

| Number | Country | Date |
|---|---|---|
| 607,397 | Great Britain | Aug. 30, 1948 |

OTHER REFERENCES

"An Electromechanical Method for Solving Equations," Schooley; RCA Review, volume III, No. 1, July 1938; pages 86–96.

"An Electrical Algebraic Equation Solver," Herr and Graham; Review of Scientific Instruments, volume 9, October 1938; pages 310–315, inclusive.